United States Patent
Hawley et al.

(12)

(10) Patent No.: US 6,221,796 B1
(45) Date of Patent: *Apr. 24, 2001

(54) SMOOTH SURFACED FOAM LAMINATE AND METHOD OF MAKING SAME

(75) Inventors: James K. Hawley, Sheffield Village; Roberta I. Gareau; Thomas S. Junnila, both of Westlake, all of OH (US)

(73) Assignee: Manco, Inc., Avon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,952

(22) Filed: May 8, 2000

Related U.S. Application Data

(63) Continuation of application No. 09/268,565, filed on Mar. 15, 1999, now Pat. No. 6,130,174, which is a continuation of application No. 08/699,804, filed on Aug. 19, 1996, now abandoned.

(51) Int. Cl.$^7$ .................................................. B32B 27/04
(52) U.S. Cl. ................... 442/43; 442/2; 442/3; 442/9; 442/16; 442/19; 442/38; 442/46
(58) Field of Search ............................ 442/43, 2, 3, 9, 442/16, 19, 38, 46

(56) References Cited

U.S. PATENT DOCUMENTS

| | | |
|---|---|---|
| 1,499,166 | 8/1924 | Frazier . |
| 2,759,866 | 8/1956 | Seymour . |
| 2,956,917 | 10/1960 | Fasano . |
| 3,160,548 | 12/1964 | Gillick, Jr. et al. . |
| 3,506,533 | 4/1970 | Berner . |
| 4,116,743 | 9/1978 | Davis . |
| 4,296,162 | 10/1981 | Jean . |
| 4,305,985 | 12/1981 | Heublein . |
| 4,307,145 | 12/1981 | Goldman . |
| 4,316,926 | 2/1982 | Kaminstein . |
| 4,460,643 | 7/1984 | Stevens . |
| 4,515,852 | 5/1985 | Katabe et al. . |
| 4,524,097 | 6/1985 | Graham . |
| 4,603,074 | 7/1986 | Pate et al. . |
| 4,668,547 | 5/1987 | Brouessard . |
| 5,120,567 | 6/1992 | Mc Dermott, III et al. . |
| 5,120,587 | 6/1992 | Mc Dermott . |
| 5,316,840 | 5/1994 | Kubo et al. . |
| 5,346,276 | 9/1994 | Dehondt . |
| 5,364,681 | 11/1994 | Pate et al. . |
| 5,518,799 | 5/1996 | Finestone et al. . |
| 5,632,844 | 5/1997 | Pate et al. . |
| 5,663,845 | 1/1999 | Owen . |
| 5,707,903 | 1/1998 | Schottenfeld . |

FOREIGN PATENT DOCUMENTS

| | | |
|---|---|---|
| PCT/US96/ 17206 | 4/1997 | (WO) . |
| PCT/US96/ 20448 | 7/1997 | (WO) . |

OTHER PUBLICATIONS

International Search Report re PCT/US98/20448.
International Search Report re PCT/US96/17206.

*Primary Examiner*—Helen L. Pezzuto
(74) *Attorney, Agent, or Firm*—Vickers, Daniels & Young

(57) ABSTRACT

A laminate material having nonslip characteristics on one surface and a smooth surface on the other side is provided. The material is created by laminating together a smooth film and a plastic foam surrounding a scrim having nonslip characteristics.

5 Claims, 1 Drawing Sheet

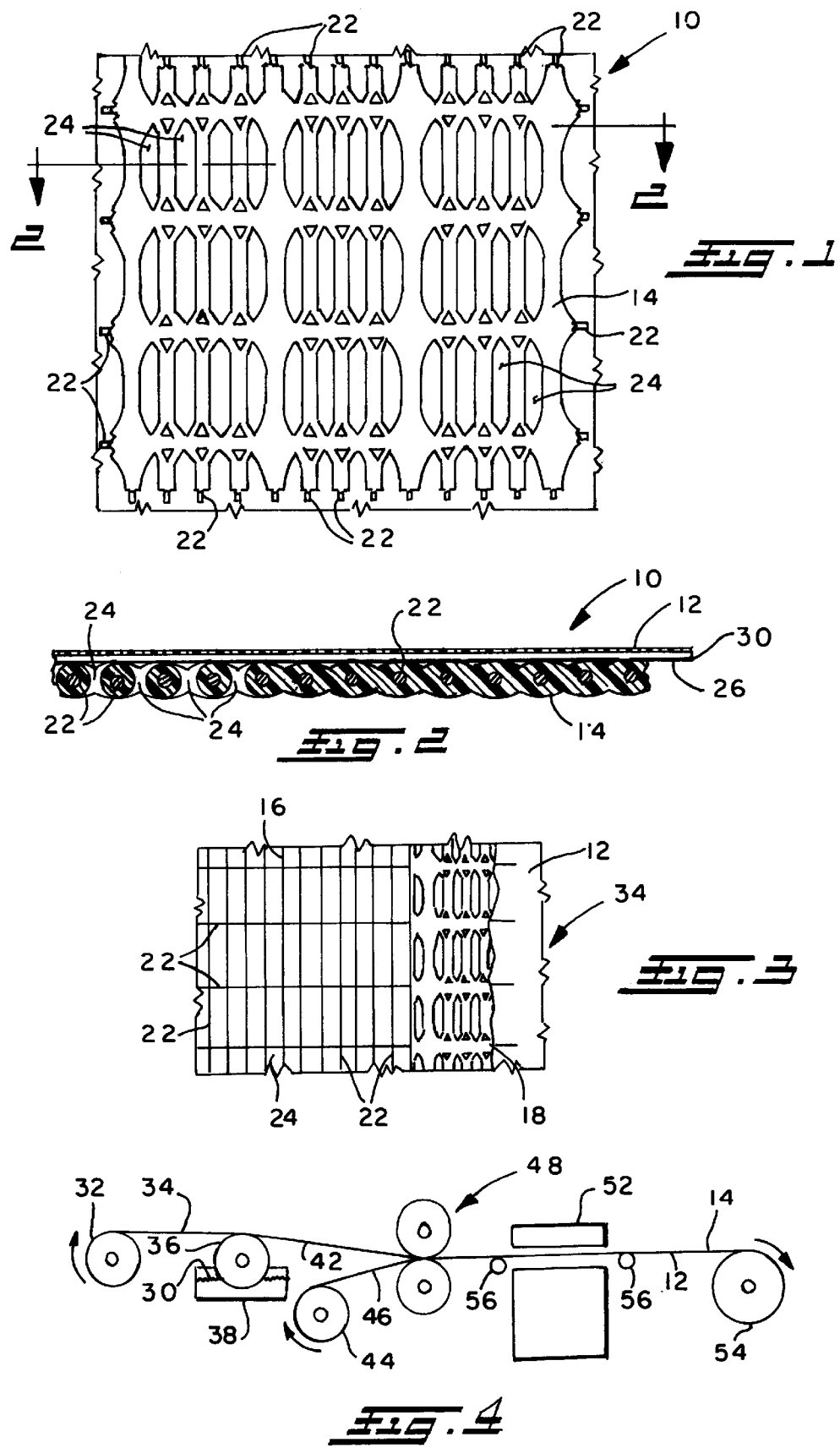

SMOOTH SURFACED FOAM LAMINATE AND METHOD OF MAKING SAME

This patent application is a continuation of application Ser. No. 09/268,565 filed on Mar. 15, 1999, now U.S. Pat. No. 6,130,174, which in turn is a continuation of application Ser. No. 08/699,804 filed on Aug. 19, 1996 now abandoned and incorporated herein by reference.

FIELD OF THE INVENTION

This invention relates to sheet material usable by a consumer and more particularly to laminate sheet materials having a smooth upper surface and a foam body usable as drawer liners, shelf liners, appliance underlayments and the like.

BACKGROUND OF THE INVENTION

Consumers use a wide variety of sheet materials in and around the home as an underlayment and lining material. Decorative papers have been used for many years to line drawers and shelves. Some decorative papers are provided with an adhesive on one side to provide a more permanent lining. Plastic materials, such as polyvinyl chloride, have also been provided in sheet form for use by consumers as liners. Some of these plastic materials are provided as a simple sheet. Other plastic materials are provided with an adhesive on one side for a more permanent installation. For more than a year, consumers have also been provided with foam plastic materials for use as liners. These materials provide cushioning and are also less prone to slipping. One such material consists of a loosely woven fabric scrim with a foam polyvinyl chloride coating. This material is noncontinuous in that the openings between many of the adjacent scrim fibers remain open after the application of the foam. The foam has a nonslip characteristic but is not an adhesive. This material provides good cushioning and nonslip characteristics. It has been well received in the consumer marketplace and used widely as a lining material and underlayment. Such foam covered scrim sheet material is commercially available in various sizes. Companies such as Griptex Industries, Inc. of Alpharetta, Ga. and American Nonslip produce such materials commercially.

All of the above described materials have negative aspects. Paper or plastic nonadhesive shelf lining can slide around on the surface to which it is applied. In drawers in particular, such linings can become bunched up and pushed to the rear of the area sought to be protected. Such shelf linings do not provide cushioning or protection for things placed on a shelf or in a drawer. Adhesive paper or plastic shelf liners do not normally become bunched up or slide when first installed. However, thereafter, portion of the adhesive may dry out allowing the lining to slide and become bunched up. In other situations, the adhesive sticks to the surface under the lining paper even when the lining paper is removed. This can mar a surface and leave an objectionable, sticky, discolored area on a shelf or in a drawer.

On the other hand, foam plastic covered scrim shelf linings have their own problems. While they do not slide on a shelf or in a drawer and can be removed, they prevent objects placed on them from sliding. A homeowner cannot put a cup on a shelf and slide it along that shelf to a desired position. Rather, it must be picked up and moved. The scrim based shelf linings are also noncontinuous. They have numerous openings forming part of the product. The appearance is therefore often not as pleasing to consumers as what can be achieved on a continuous paper or plastic surface.

SUMMARY OF THE INVENTION

It is the principle object of the invention to provide a shelf lining material overcoming the above referred to negative aspects which is nonslip, nonadhesive and provides a continuous top surface.

It is another object of the present invention to provide a lining material having an upper surface which is pleasing in appearance, colorful and smooth.

It is still another object of the present invention to provide a shelf lining product which is easily cut with scissors, will maintain its shape and position, is not adhesive, and has a continuous smooth top surface.

In accordance with the present invention, there is provided a laminate product comprised of a scrim based plastic foam sheet layer and a thin continuous smooth surface layer bound thereto.

Further in accordance with the invention, the scrim based foam plastic layer is of the type commercially available providing nonslip characteristics.

Still further in accordance with the invention, the smooth surfaced thin continuous sheet material is bound to the foam scrim layer by means of adhesive or thermal binding.

Yet further in accordance with the invention, the smooth sheet layer is bound to the scrim-foam layer by means of an adhesive.

Still further in accordance with the invention, the thin sheet smooth surfaced layer is a continuous sheet of smooth plastic such as polyvinyl chloride.

Yet further in accordance with the invention, the thin sheet smooth material is a plastic material having a coating of pressure sensitive adhesive thereon which is applied to the scrim foam material providing a finished product.

DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 is a plan view of the laminate of the present invention looking at the bottom side;

FIG. 2 is a cross section of the present invention;

FIG. 3 is a schematic plan view of the scrim based material used in the invention; and, FIG. 4 is a schematic diagram of a method and apparatus for making the smooth foam laminate seen in FIGS. 1 and 2.

DESCRIPTION OF THE PREFERRED EMBODIMENT

Referring now to the drawings wherein the showings are made for the purposes of illustrating a preferred embodiment of the invention only and not for purposes of limiting same, FIGS. 1 and 2 show a laminate 10. The laminate 10 comprises a smooth continuous top layer 12 and a noncontinuous porous foam bottom layer 14. The bottom layer 14 comprises a loosely woven scrim 16 (FIG. 3) having a rubber or plastic material 18 foamed onto the scrim. The threads 22 of the scrim 16 are loosely woven having large apertures 24 between adjacent threads 22. A preferred material has at least some threads spaced at least about 0.05 inches apart. When the foam material is applied to the scrim, it does not fill in the apertures 24 between adjacent threads 22 but merely form thicker strings around the scrim threads 22. When cured, the resulting material has a nonslip characteristic. This foam plastic covered scrim material forming the bottom layer 14 is conventional and commercially available. Portions of the foam bottom layer have a thickness of about 0.03 to 0.12 inches; preferably 0.05 to 0.1 inches. Thinner or thicker foam covered scrim layers may also be used.

The top layer 12 is smooth and continuous. In a preferred embodiment, the top layer is a continuous flexible plastic sheet having a thickness of about 0.004 inches to 0.008 inches and an adhesive backing 26. The top layer 12 is much thinner than the bottom layer 14. Textured or smooth continuous plastic or paper films can be used. In the preferred embodiment, a vinyl plastic film is used.

A method of manufacturing the laminate product 10 is shown in FIG. 4. A foamed scrim material supply reel 32 is driven to supply scrim material 34 (as seen in FIG. 3) at a selected rate. The scrim material 34 passes over and in contact with an adhesive transfer roller 36. The adhesive transfer roller 36 is rotated so that its periphery has the same speed as the moving scrim material 34. The adhesive transfer roller picks up adhesive 30 from an adhesive supply 38 and transfers the adhesive 30 to the underside 42 of the scrim material 34.

A sheet material supply reel 44 is driven to supply sheet material 46 at a rate identical to the supply speed of the scrim material 34. The scrim material, covered with adhesive, and the sheet material 46 are pressed together in pinch rollers 48. The united material passes through a drying oven 52 and is gathered on a take-up reel 54. In this particular arrangement, the united material passes through the oven 52 with what has been previously referred to as the "top layer" on the bottom and the "bottom layer" 14 on the top. This allows the united material to be supported on support rollers without undue adhesive transfer.

The adhesive 30 in the adhesive supply 38 is any of the commercially available laminating adhesives which are often water based. The adhesive in the supply 38 is coated only onto the scrim portions which contact the transfer roller 36. As the scrim material 34 is discontinuous and has many openings, the portions of the sheet material 46 which do not come into contact with scrim material 34 in the pinch roller 48 remain free of adhesive. Adhesive is only applied where it is needed, at the place where the scrim material 34 and the sheet material 46 meet one another. Because the adhesive contained in the adhesive supply 38 is water based, the heating oven 52 is kept relatively cool. Its function is to drive off the moisture in the adhesive. Because the temperature is kept relatively low, stretching and warping of the product is avoided.

A hot melt adhesive could also be used. Such an adhesive would not require a drying oven.

Alternatively, the sheet material 46 can be supplied with an adhesive coating already in place. Such materials are widely available and sold to consumers as shelf lining material, labels and the like. Such materials are available based on a plastic film, a paper film, and also on composite films. Any type of adhesive coated film can be selected to provide a smooth, textured, colored or printed surface as desired. The same choices may be made in selecting a film which is not precoated with adhesive.

Obviously, when a film 46 is selected having an adhesive precoating, the coating of a laminating adhesive onto the scrim material 34 is dispensed with. However, an adhesive free film can be coated as described above and a scrim layer pressed to the coated layer in pinch rollers.

The invention has been described with reference to a preferred embodiment and several variations thereon. Obviously, modifications and alterations will occur to others upon the reading and understanding of this specification and it is intended to include such modifications and alterations insofar as to come within the scope of the appended claims or the equivalents thereof.

What is claimed is:

1. A laminated non-slip shelf liner product comprising: a continuous generally flat vinyl plastic sheet layer; a scrim layer comprising a scrim coated with a foamed polyvinyl chloride plastic; means binding said scrim layer to said flat sheet layer.

2. The laminated non-slip shelf liner product of claim 1, wherein said binding means is an adhesive.

3. The laminated non-slip shelf liner product of claim 1, wherein said scrim layer comprises threads having spaces of at least about 0.05 inches between some of said threads and a foam layer surrounding said threads and said scrim layer has some areas of at least 0.05 inches thick.

4. The laminated non-slip shelf liner product of claim 3, wherein said continuous generally flat sheet layer is about 0.004 inches to 0.008 inches thick.

5. A laminated non-slip shelf liner product comprising: a continuous generally flat vinyl plastic sheet layer; a scrim layer comprising a scrim coated with a foamed polyvinyl chloride plastic; means permanently binding said scrim layer to said flat sheet layer.

* * * * *